2,171,982

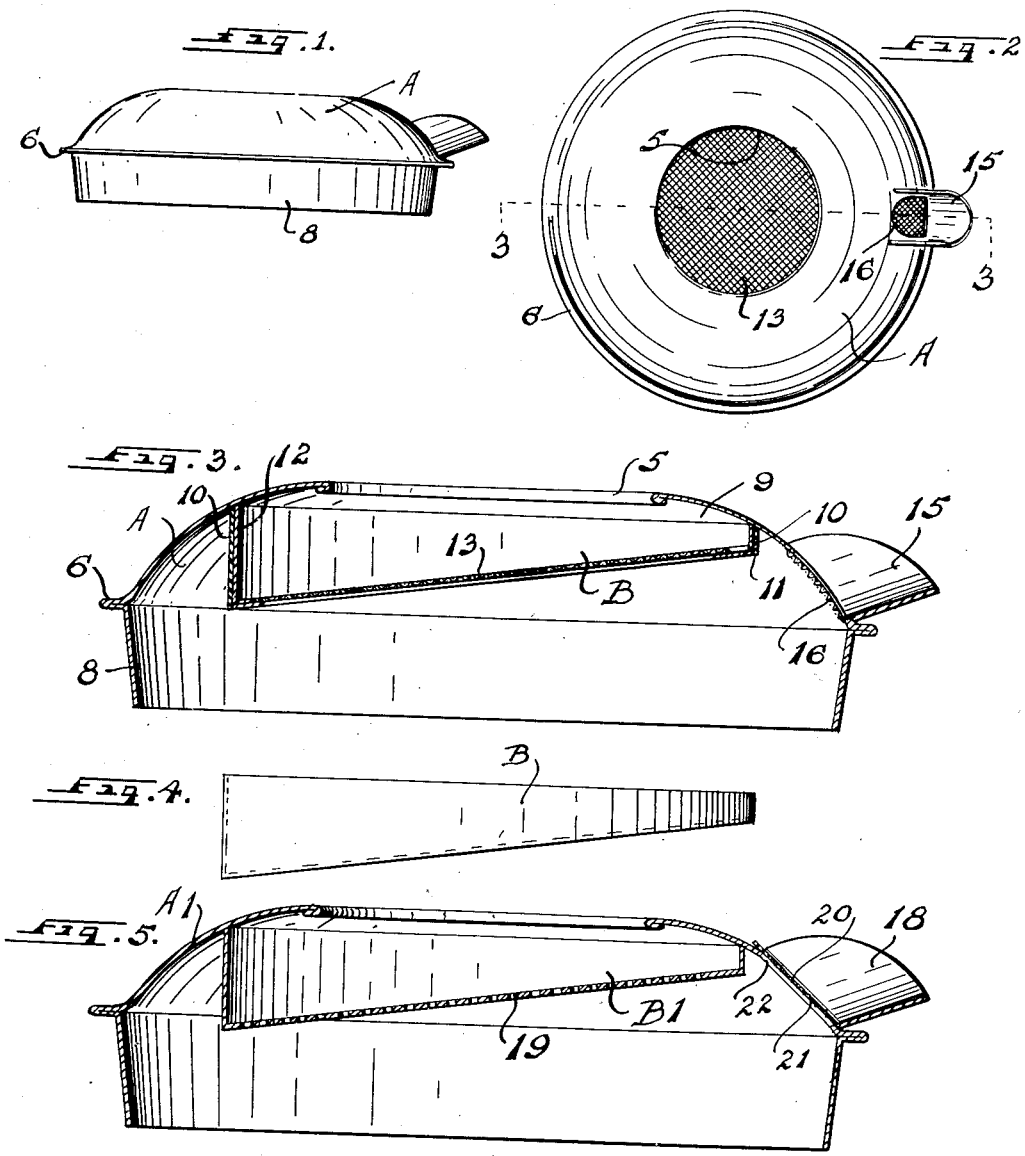
Sept. 5, 1939.        K. HOLBROOK        2,171,982
MILK BUCKET COVER AND STRAINER
Filed Sept. 7, 1937
Inventor
Keith Holbrook
By R. M. Thomas
Attorney Patented Sept. 5, 1939

UNITED STATES PATENT OFFICE 2,171,982

MILK BUCKET COVER AND STRAINER

Keith Holbrook, Salt Lake City, Utah

Application September 7, 1937, Serial No. 162,654

3 Claims. (Cl. 210—155)

My invention relates to milk bucket strainers and has for its object to provide a new and efficient cover and screen for milk buckets.

A further object is to provide a milk bucket and strainer which will keep all foreign material from dropping in the bucket from the air or from the sides of the cow and which will therefore provide a sanitary cover for the bucket.

A still further object is to provide a milk bucket cover which has a removable screen set therein and adapted to be removed for cleaning to enable the dairy man to keep it entirely clean and sanitary and to permit the use of a cloth strainer therein if desired for any local law requirements.

A still further object is to provide a milk bucket cover carrying a flange to fit in the bucket and with a screen or perforated screening medium mounted therein at an angle to prevent the milk from splashing all over the legs of the milker due to the force of milk hitting the strainer.

These objects I accomplish with the device illustrated in the accompanying drawing in which similar numerals and letters of reference indicate like parts throughout the several views and as described in the specification forming a part of this application and pointed out in the appended claims.

In the drawing

Figure 1 is a side elevation of the milk bucket cover.

Figure 2 is a plan view thereof.

Figure 3 is a section on line 3—3 of Figure 2.

Figure 4 is a side view of the removable strainer.

Figure 5 is a diametrical section of a modified type of strainer in which the strainer is not removable but, in which the screen on the outlet spout is made removable.

In the drawing I have shown the device as an inwardly curved dome-shaped body A, having a central opening 5 therein through which the milk is introduced into the bucket. The outer edge of the dome A is a flanged base 6 to make a flange to fit over the top of the bucket and prevent any chance of dirt entering the bucket from the top.

Depending around the dome and spaced in from the flange 6 is a frustum shaped flange 8 adapted to fit into the open top of a milk bucket. Within the dome A and spaced in from the flange 8 there is a depending cylindrical chamber 9 with the walls 10 thereof cut off on the bottom 11 of the cylinder at an angle to the horizontal base of the dome A. Into this chamber 9 and fitting the walls 10, I then provide a filter member B having sides forming a cylinder 12, said cylinder having the bottom partially closed at an angle identical to that of the angle cut 11 on the bottom of the walls 10. The greater area of this bottom is made of porous material such as screen wire 13 or perforated sheet metal filters.

A discharge spout 15 is mounted on one side of the dome A preferably in the side on which the least angle of the cylinder 10 is formed. This spout 15 is secured over a screened opening 16 to insure no dirt entering the bucket through the spout to aid the aeration of the milk being poured from the bucket and act as a double screening for the milk both keeping it clean and aiding in the cooling of the milk.

In Figure 5 I have shown the dome as A1, the spout as 18 and within the dome I provide a permanently secured screening member B1. This member is provided with either perforated metal base 19 or a screen (not shown). The outlet spout 18 is provided with a slot 20 therein in which a removable screen 21 is inserted to close the opening 22 of the spout.

It will be obvious that such changes and modifications may be made in the construction as that shown in Figure 5 without departing from the spirit of the invention or the scope of the claims.

Having thus described my invention I desire to secure by Letters Patent and claim:

1. In a milk strainer, the combination of a dome shaped body having a central opening through the top and carrying a depending flange around the perimeter of the body on the under side to fit into the top of a bucket; a depending cylinder on the under side of said dome, said cylinder being of greater diameter than said opening in said dome shaped body to prevent splashing of the milk from the opening; and a screen member formed of a cylinder to fit said depending cylinder and a slanting screen bottom to strain the milk after it enters the central opening.

2. A milk strainer of the class described, comprising a dome shaped body having a flange around its perimeter to rest upon the top edge of a bucket; a depending inwardly tapered flange extending down from said body to fit within the inner face of the top of the bucket; a cylinder secured to the inner side of said dome-shaped body, said cylinder being of greater diameter than the opening through said dome-shaped body forming a splash flange in the space between the opening in said dome-shaped body and the inner perimeter of said cylinder, the bottom of said cylinder being cut off on an angle; a spout extending out from one side of said dome-shaped body for pouring milk from said bucket; a screen in the mouth of said spout; and a perforate bottom mounted across the angled end of said cylinder to screen all milk entering the bucket.

3. A device as set out in claim 1, including a screened spout from which the milk may be poured from the bucket.

KEITH HOLBROOK.